Patented Aug. 15, 1944

2,356,009

UNITED STATES PATENT OFFICE 2,356,009

PROCESS FOR MANUFACTURING HARD METAL COMPOSITIONS

Paul Schwarzkopf, Yonkers, N. Y., assignor to American Cutting Alloys, Inc., Yonkers, N. Y., a corporation of Delaware No Drawing. Application August 2, 1941, Serial No. 405,247. In Germany May 16, 1929

2 Claims. (Cl. 75—137)

This invention relates to a method of producing particularly efficient hard compositions for tools which heretofore have been manufactured by sintering or melting metal carbide, or admixing tungsten carbide with lower melting auxiliary metal and sintering the mixture in desired shape.

In particular, tungsten carbide has been admixed with cobalt or nickel, shaped and sintered and thereby a hard as well as tough tool material was obtained.

This invention forms a continuation in part of my copending application Ser. No. 204,999, filed April 29, 1938, now Patent 2,265,010, which in turn forms a continuation in part of my then copending applications Ser. No. 164,166, filed September 16, 1937, and issued into Patent 2,170,433, and Ser. No. 155,919, filed July 27, 1937, and issued into Patent 2,170,432, and of my copending application Ser. No. 727,781, filed May 26, 1934, which in turn was copending with my application Ser. No. 743,717, filed September 12, 1934, and issued into Patent No. 2,122,157, the latter two applications being continuations in part of my then pending patent application Ser. No. 625,042, filed July 27, 1932, and issued into Patent 2,091,017, which in turn was copending with my Patent applications Ser. No. 656,103, filed February 10, 1933, and issued into Patent 1,959,879, and Ser. No. 452,132, filed May 13, 1930.

In order to increase the hardness and other qualities of the tool material, two or more hard and refractory metal carbides are employed, compounded in substantial amounts into carbide mixed crystals or solid solutions, i. e. homogeneous carbide crystal structures containing atoms of two or more metal elements and of carbon in an amount required to form carbide with those metal atoms. These carbide crystal structures are thereafter powdered again, if necessary, and admixed with powdery lower melting auxiliary metal essentially, i. e. completely or almost completely of the iron group in amounts from about 3% to 22% by weight, shaped under pressure and eventually sintered so that upon cooling a substantially dense and tough body results. During final sintering the auxiliary metal acts as a sintering-aid and in the solidified body as a metal cement or filler.

The mixed crystals or homogeneous carbide crystal structures contain, besides carbon atoms, two or more different kinds of metal atoms, viz. of tungsten and other metal elements, such as of molybdenum, titanium, boron, tantalum, columbium, vanadium, capable of forming with carbon hard and refractory carbides which withstand high operation temperatures and are not dissolved by water or other liquids employed for cooling or other purposes at operation temperatures.

According to the invention, for the production of such carbide mixed crystals or carbide crystal structures homogeneously containing atoms of two or more metal elements of the type referred to above in addition to carbon atoms, the metal tungsten, with or without the addition of other metals capable of forming hard and refractory carbide, and preferably pulverized solid carbon in sufficient amount to form carbide with tungsten and those other metal elements if added, are admixed with finely divided titanium carbide, and heated to suitable extent preferably in an electric furnace and/or by leading electrical current through the mix. A protective gas or vacuum may be employed to advantage.

Heating of the mixture is to be effected preferably at a temperature between about 1600° to about 2000° C. and higher, for instance up to 2600° C. The carbide crystal structures so obtained, essential amounts or all of which contain homogeneously atoms of two or more metal elements and of carbon, are thereafter admixed with about 3% to 22% lower melting auxiliary metal essentially, i. e. mainly or entirely of the iron group, shaped and finally sintered within a temperature range of about 1330° to 1600° C. for about 1 to 4 hours, or a major part of one hour so that upon cooling, a shaped, substantially dense and tough body results which can effectively be used for tool elements and other working appliances.

Illustrations of the compositions resulting therefrom are stated in my above mentioned previous patent applications and patents.

The present invention suggests an advantageous and simple process for producing homogeneous carbide crystal structures containing metal atoms of titanium and of one or more other metal elements specified hereinbefore in addition to carbon atoms, the latter in an amount required to form carbide with those metal atoms. The solidified carbide crystal structures are of great density, in particular if in their production according to the invention heat above about 2000° C. has been applied.

The homogeneous carbide crystal structures containing atoms of two or more metal elements besides carbon are harder than the solvent carbide structure, resist more effectively recrystallisation during final sintering and physical and chemical attacks at operation temperatures, and are of controllable weight and heat conductivity.

What I claim is:

1. In a process of manufacturing a hard composition substantially by preparing hard and refractory carbide crystal structures containing atoms of carbon in addition to atoms of tungsten and titanium, substantial amounts of which homogeneously contain, in solid solution, atoms of tungsten and titanium in addition to carbon atoms to form carbide therewith, powdering and intimately admixing the carbide crystal structures with powdery auxiliary metal essentially selected from the group consisting of nickel and cobalt in amounts from about 3% to about 22%, shaping under pressure and finally sintering the latter mixture at a temperature between about 1330° to about 1600° C.: the steps of preforming substantial amounts of said carbide crystal structures in solid solution by intimately admixing in finely divided state titanium carbide with tungsten and carbon sufficient to form carbide with said tungsten, and heating the mixture to a temperature ranging from about 1600° C. to about 2600° C. until said tungsten, carbon and titanium carbide are compounded substantially into said carbide crystal structures in solid solutions.

2. In a process of manufacturing a hard composition substantially by preparing hard and refractory crystalline carbide structures containing atoms of carbon and titanium, in addition to atoms of at least one other element selected from the group consisting of tungsten, molybdenum, tantalum, columbium, vanadium and boron, substantial amounts of said carbide crystal structures homogeneously containing, in solid solution, atoms of titanium and of said selected metal element in addition to carbon atoms to form carbide therewith, powdering and intimately admixing the carbide crystal structures with powdery auxiliary metal essentially selected from the iron group in amounts from about 3% to about 22% shaping under pressure and finally sintering the latter mixture at a temperature between about 1330° to about 1600° C.: the steps of preforming substantial amounts of said carbide crystal structures in solid solution by intimately admixing in finely divided state titanium carbide and at least one metal element selected from said group and carbon sufficient to form carbide with said selected metal element, and heating the mixture to a temperature ranging from about 1600° to about 2600° C. until said metal element, carbon and titanium carbide are substantially compounded into said carbide crystal structures in solid solution.

PAUL SCHWARZKOPF.

DISCLAIMER 2,356,009.—*Paul Schwarzkopf*, Yonkers, N. Y. PROCESS FOR MANUFACTURING HARD METAL COMPOSITIONS. Patent dated Aug. 15, 1944. Disclaimer filed Jan. 15, 1947, by the assignee, *American Cutting Alloys, Inc.*

Hereby enters this disclaimer of boron carbide as any part of the thing patented in the claims or disclosed in the specification of the patent, and specifically disclaims on page 1, first column, last line, the word "boron", and in claim 2, line 7, the words "and boron".

[*Official Gazette February 11, 1947.*]

DISCLAIMER 2,356,009.—*Paul Schwarzkopf*, Yonkers, N. Y. PROCESS FOR MANUFACTURING HARD METAL COMPOSITIONS. Patent dated Aug. 15, 1944. Disclaimer filed Jan. 15, 1947, by the assignee, *American Cutting Alloys, Inc.*

Hereby enters this disclaimer of boron carbide as any part of the thing patented in the claims or disclosed in the specification of the patent, and specifically disclaims on page 1, first column, last line, the word "boron", and in claim 2, line 7, the words "and boron".

[*Official Gazette February 11, 1947.*]